Figure 1:
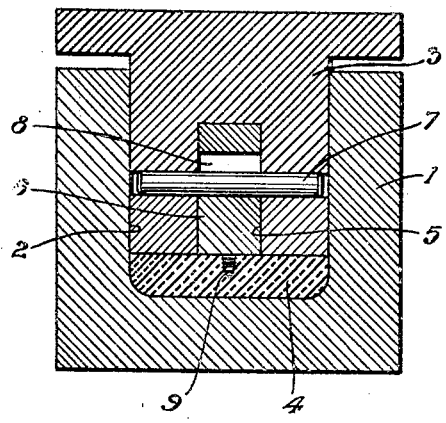

W. H. KEMPTON.
MOLD.
APPLICATION FILED FEB. 25, 1919.

1,354,198.

Patented Sept. 28, 1920.

WITNESSES:
Geo. D. Barrett
W. H. Woodman.

INVENTOR
Willard H. Kempton.
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOLD.

1,354,198.  Specification of Letters Patent.  Patented Sept. 28, 1920.

Application filed February 25, 1919. Serial No. 279,128.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molds, of which the following is a specification.

My invention relates to molds and more particularly to molds for molding composite bodies comprising superimposed layers of fibrous sheet material, impregnated with a binder, and it has, for its primary object, the provision of a mold structure of such character as to greatly facilitate the removal of a molded body therefrom.

Heretofore, with molds of certain designs, great difficulty has been experienced in removing the molded body, particularly in some cases where the body has a tendency to stick to the walls of the mold chamber. In view of this, I provide a pressure-applying member or plunger, which forms a part of the mold, with spurs or prongs which will be embedded in the molded body during its molding or curing and which, because of this engagement with the molded body, will withdraw the body from the mold when the plunger is removed.

In this connection, a still further object of my invention resides in mounting the spurs or prongs for movement relative to the plunger in order that the molded article may drop away somewhat from the plunger as the plunger and article are being removed from the mold, so that the detachment of the molded article from the spurs may be facilitated.

With these and other objects in view, my invention will be more fully described, illustrated in the drawings, in the several views of which corresponding numerals indicate like parts, and then particularly pointed out in the claims.

Figure 2:
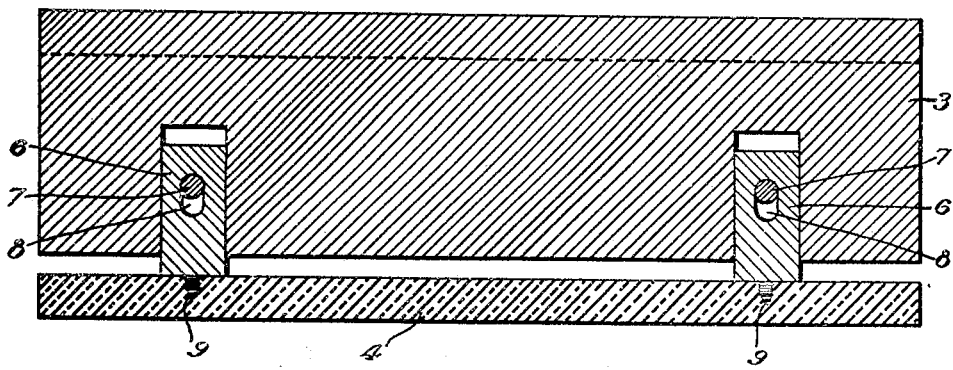

In the drawings, Figure 1 is a transverse, sectional view taken through a mold embodying my invention, and Fig. 2 is a central, longitudinal, vertical, sectional view taken through the plunger and the finished article, showing the positions of the parts after the plunger has been withdrawn from the mold, bringing with it the molded article.

My invention may be embodied in molds of all kinds in which a pressure-applying element, separable from the body of the mold, is employed but, for the sake of clearness, I have illustrated my invention in connection with a simple form of mold. This mold may comprise a body 1 formed with a mold chamber 2 and a pressure-applying member or plunger 3 adapted to seat in the chamber 2 and to compress and mold a body 4 of moldable material disposed within the chamber.

In practising my invention, the work-engaging face of the pressure-applying member or plunger 3 may be formed with one or more sockets or recesses 5 which may slidably receive studs 6 so proportioned that, when their inner ends engage the ends of the sockets, their outer faces lie flush with the work-engaging face of the plunger, as shown in Fig. 1. The studs 6 may be held in place by means of pins 7 extending transversely through the plunger and through slots 8 formed in the studs in such manner as to allow limited sliding movement of the studs so that, when the plunger is removed from the mold, the studs may occupy the positions shown in Fig. 2. The outer end of each stud may be provided with one or more spurs or prongs 9 which, if desired, may be screw threaded.

When employing a mold embodying my invention, the assembled body to be molded is disposed in the mold chamber 2, the plunger is introduced into the chamber and pressure is applied to it, in any suitable manner, to cause it to compress and properly shape the body of moldable material. If the binder of this body is one which is hardened or cured by the application of heat, together with the pressure applied, the mold may be heated in any suitable well known manner.

It will be obvious that this molding of the body will embed the spurs or studs in the molded article so that, when the plunger is removed from the mold, the article will be withdrawn with it and will hang suspended from it, as shown in Fig. 2.

If large articles are being molded, it may be necessary to thread the spurs to such an extent that the article cannot be readily pulled from them, but under these circumstances, the pins 7 may be driven out of the plunger in order that the studs may be detached and then turned to screw the spurs out of the articles.

Under these circumstances, it will be obvious that the molded article may be readily grasped and pulled from the spurs. As my invention may be embodied in molds of all characters employed for numerous purposes and as various modifications may be desirable, when adapting it to molds of different types, it will be appreciated that no limitations are to be imposed upon my invention other than those indicated in the appended claims.

I claim as my invention:

1. In a mold, a pressure-applying member provided with a recess in its work-engaging face, a stud slidably retained in the recess and a spur projecting from the outer end of the stud.

2. In a mold, a pressure-applying member having a recess formed in its work-engaging face, a stud slidably mounted in the recess, means for limiting movement of the stud, and a spur projecting from the outer face of the stud.

3. In a mold, a pressure-applying member formed with a recess in its work-engaging face, a stud slidably mounted in the recess and so proportioned that, in its innermost position, its outer end lies flush with the work-engaging face of the pressure-applying member, a pin extending through the pressure-applying member and through a slot formed in the stud to limit the movement of the stud, and a spur projecting from the outer end of the stud.

4. A mold comprising a mold body provided with a molding chamber, a plunger insertible in the molding chamber to compress the body disposed therein, and means carried by the plunger to engage the molded body so arranged that, when the plunger is removed, the molded body will be withdrawn from the chamber.

In testimony whereof, I have hereunto subscribed my name this 19th day of Feb. 1919.

WILLARD H. KEMPTON.